(12) United States Patent
Kawamura et al.

(10) Patent No.: US 8,633,388 B2
(45) Date of Patent: Jan. 21, 2014

(54) ATTACHING STRUCTURE OF BANDING BAND

(75) Inventors: Yukihiro Kawamura, Kakegawa (JP); Hiroaki Kamo, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 13 days.

(21) Appl. No.: 13/545,020

(22) Filed: Jul. 10, 2012

(65) Prior Publication Data
US 2013/0017012 A1 Jan. 17, 2013

(30) Foreign Application Priority Data
Jul. 12, 2011 (JP) ................................. 2011-153676

(51) Int. Cl.
*H01B 7/00* (2006.01)
(52) U.S. Cl.
USPC ........................................................ 174/72 A
(58) Field of Classification Search
USPC .............................................. 174/72 A, 68.1
See application file for complete search history.

(56) References Cited

U.S. PATENT DOCUMENTS

| 7,390,967 | B2 * | 6/2008 | Daito ........................... 174/72 A |
| 7,780,459 | B2 | 8/2010 | Yamamoto et al. |
| 8,013,265 | B1 * | 9/2011 | Fujita et al. ................... 200/293 |
| 2012/0266415 | A1 * | 10/2012 | Takeuchi et al. .................. 24/27 |

FOREIGN PATENT DOCUMENTS

| JP | 2007-174821 A | 7/2007 |
| JP | 2008-232222 A | 10/2008 |
| JP | 2009-077484 A | 4/2009 |
| JP | 2010-004632 A | 1/2010 |

* cited by examiner

*Primary Examiner* — Phuong Dinh
(74) *Attorney, Agent, or Firm* — Edwards Wildman Palmer LLP

(57) ABSTRACT

An attaching wall 82 is interposed between first and second walls 81*a*, 81*b*. A banding band 9 is inserted from a first gap 83*a* provided between the attaching wall 82 and the first wall 81*a* to a second gap 83*b* provided between the attaching wall 82 and the second wall 81*b*, there by the banding band 9 is attached to the attaching wall 82. A through-hole 8 is provided on the attaching wall 82. A first guide wall 85*a* inclined toward the attaching wall 82 as extended toward the second wall 81*b* is arranged at a position facing the through-hole 84. Further, a second guide wall 85*b* inclined toward the attaching wall 82 as extended toward the second wall 81*b* is arranged at a position facing the second gap 83*b*.

8 Claims, 6 Drawing Sheets

(A)  (B)

(A)  (B)

(a)

(b)

ATTACHING STRUCTURE OF BANDING BAND

CROSS REFERENCE TO RELATED APPLICATIONS

This application is on the basis of Japanese Patent Application No. 2011-153676, the contents of which are hereby incorporated by reference.

BACKGROUND OF THE INVENTION

1. Field of the Invention

The present invention relates to an attaching structure of a banding band, in particular, the attaching structure of the banding band for fixing a wiring harness to an electrical junction box with the banding band.

2. Description of the Related Art

A banding band is commonly used for fixing a wiring harness to an electrical junction box (PTL 1 to 3). As an attaching structure of such a banding band, for example, as shown in FIG. 9, it is proposed that the wiring harness is attached to the electrical junction box by inserting the banding band into two holes provided on an outer wall of the electrical junction box.

As shown in FIG. 9, the above attaching structure of a banding band 100 includes: an attaching wall 103 composing an outer wall of the electrical junction box and to which the banding band 200 is attached; and first and second walls 101, 102 between which the attaching wall 103 is interposed. A first hole 104 as a first gap is provided between the attaching wall 103 and the first wall 101, and a second hole 105 as a second gap is provided between the attaching wall 103 and the second wall 102. The banding band 200 is attached to the attaching wall 103 by inserting the banding band 200 from the first hole 104 to the second hole 105.

Further, the attaching structure of a banding band 100 shown in FIG. 9 is provided with a pair of guide walls 106, 107 respectively joined to the first and second walls 101, 102 and respectively facing the first and second holes 104, 105. The guide wall 106 is provided with an inclined face 106a separating from the first hole 104 as extended away from the first wall 101, and an inclined face 106b approaching the first hole 104 as extended away from the first wall 101. The inclined face 106a is provided at a side near the first wall 101 of the guide wall 106, and the inclined face 106b is provided at a side away from the first wall 101 of the guide wall 106. Further, the guide wall 107 is provided with an inclined face 107a approaching the second hole 105 as extended close to the second wall 102. The inclined face 107a is provided at a side near the second wall 102 of the guide wall 107.

According to the configuration described above, as shown in FIG. 9, when the banding band 200 is inserted into the first hole 104, while a tip of the banding band 200 is slidingly abutted on the inclined faces 106a, 106b of the guide wall 106, the tip of the banding band 200 is curved toward the attaching wall 103, and moved toward an opening of the second hole 105 continued to the attaching wall 103. When the tip of the banding band 200 is further moved, the tip is slidably abutted on the inclined face 107a of the guide wall 107, further curved toward the second hole 105, and penetrates the second hole 105. Thus, by only inserting the tip of the banding band 200 along the guide walls 106, 107 and the attaching wall 103, the banding band 200 is easily inserted into both the first and second holes 104, 105.

However, according to the attaching structure of a banding band 100, a stripping hole 108 for forming the attaching wall 103 is provided between a pair of guide walls 106, 107. Therefore, as shown in FIG. 10, there is a problem that the banding band 200 may be inserted into the stripping hole 108, and the tip of the banding band 200 inserted from the first hole 104 may not be guided to the second hole 105.

Therefore, conventionally, a width W of the attaching wall 103 is reduced so that a size of the stripping hole 108 is reduced to prevent the banding band 200 from being inserted into the stripping hole 108. However, when the width W of the attaching wall 103 is reduced, the wiring harness attached with the banding band 200 may be rotated around the attaching wall 103, and there is a problem that the wiring harness may be displaced.

CITATION LIST

Patent Literature

Patent Literature 1: JP, A, 2009-77484
Patent Literature 2: JP, A, 2007-174821
Patent Literature 3: JP, A, 2010-4632
Patent Literature 4: JP, A, 2008-232222

SUMMARY OF INVENTION

Technical Problem

Accordingly, an object of the present invention is to provide an attaching structure of a banding band able to surely guide the binding band inserted from a first gap to a second gap, and to prevent a wiring harness from being displaced.

Solution to Problem

For achieving the object, according to a first aspect of the present invention, there is provided an attaching structure of a banding band including:
an attaching wall to which the banding band is attached;
first and second walls between which the attaching wall is interposed;
a first gap provided between the attaching wall and the first wall;
a second gap provided between the attaching wall and the second wall;
a through-hole provided on the attaching wall;
a first guide wall opposed to the through-hole and inclined toward the attaching wall as extended toward the second wall; and
a second guide wall joined to the second wall, opposed to the second gap, and inclined toward the attaching wall as extended toward the second wall,
wherein the banding band is inserted from the first gap to the second gap to attach the banding band to the attaching wall.

According to a second aspect of the present invention, there is provided the attaching structure of a banding band as described in the first aspect,
wherein an end at the second wall side of the first guide wall is provided nearer the attaching wall than an end at the first wall side of the second guide wall.

According to a third aspect of the present invention, there is provided the attaching structure of a banding band as described in the first or second aspect, further including:
a third guide wall projected from the first wall toward the second wall, disposed at a position facing the first gap, and inclined away from the first gap as extended away from the first wall.

According to a fourth aspect of the present invention, there is provided the attaching structure of a banding band as described in any one of the first to third aspects, wherein a portion of the attaching wall nearer the first wall than the through-hole is inclined toward the first guide wall as extended away from the first wall, and a portion of the attaching wall nearer the second wall than the through-hole is inclined toward the first guide wall as extended away from the second wall.

Advantageous Effects of Invention

As explained above, according to the first aspect of the present invention, the through-hole on the attaching wall works as a stripping hole for forming the first guide wall. The second guide wall can be provided at the center of a stripping hole for forming the attaching wall. Thus, when the first guide wall is provided by providing the through-hole on the attaching wall, a size of the stripping hole for forming the attaching hole can be reduced even when a width of the attaching wall is increased. Therefore, a tip of the banding band inserted into the first gap is slidably abutted on the first guide wall, thereby curved toward the second gap, and then inserted into the second gap. Further, even when the tip of the banding band is not slidably abutted on the first guide wall, the tip is slidably abutted on the second guide wall, curved toward the second gap, and then inserted into the second gap. Further, the banding band can be fixed at two points. Therefore, the banding band inserted from the first gap can be surely guided to the second gap, and the wiring harness is prevented from being displaced.

According to the second aspect of the present invention, the tip of the banding band which is not slidably abutted on the first guide wall can be surely slidably abutted on the second guide wall.

According to the third aspect of the present invention, by providing the third guide wall, the banding band inserted from the first gap can be further surely guided to the second gap.

According to the fourth aspect of the present invention, the wiring harness is further surely prevented from being displaced.

These and other objects, features, and advantages of the present invention will become more apparent upon reading of the following detailed description along with the accompanied drawings.

DESCRIPTION OF EMBODIMENTS

Figure 1:
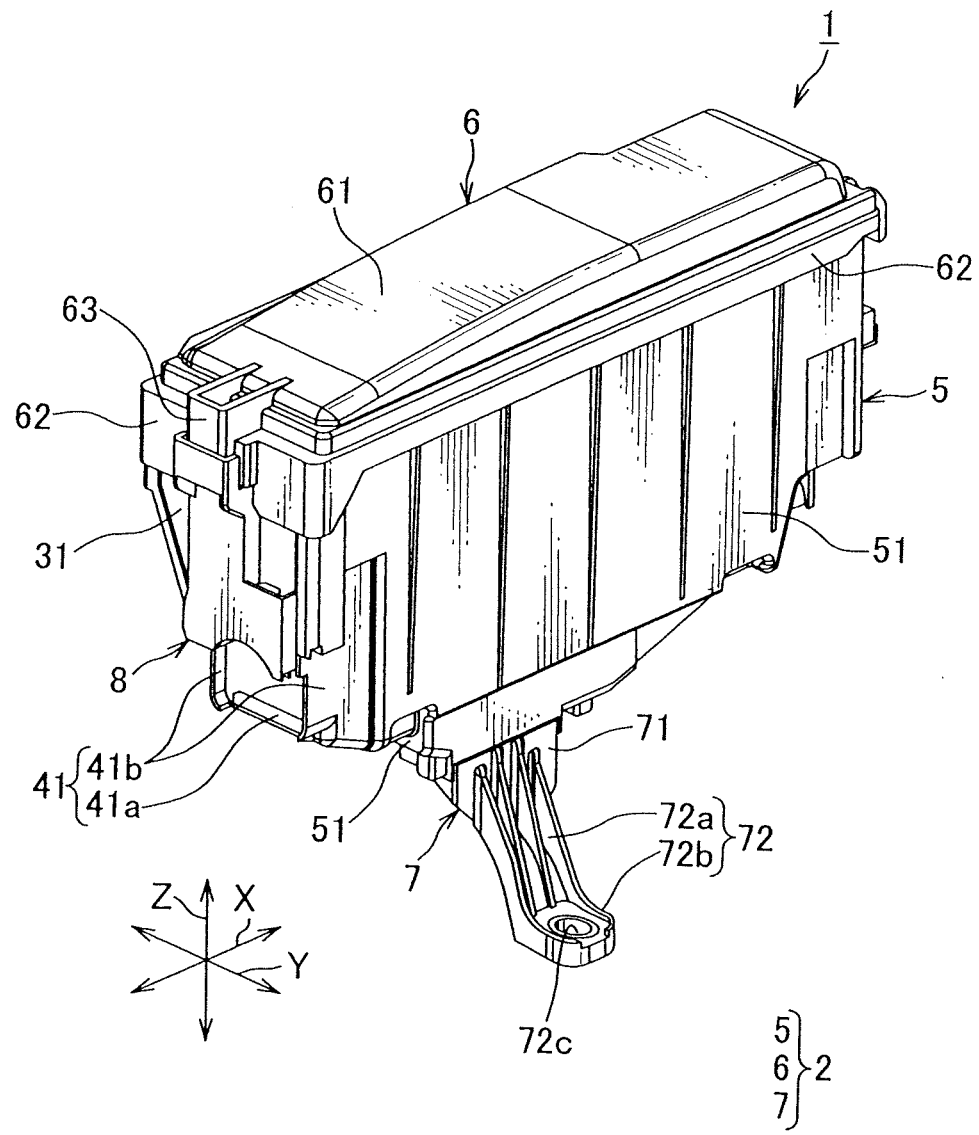
FIG. 1 is a perspective view showing an embodiment of an electrical junction box having an attaching structure of a banding band according to the present invention.
Figure 2:
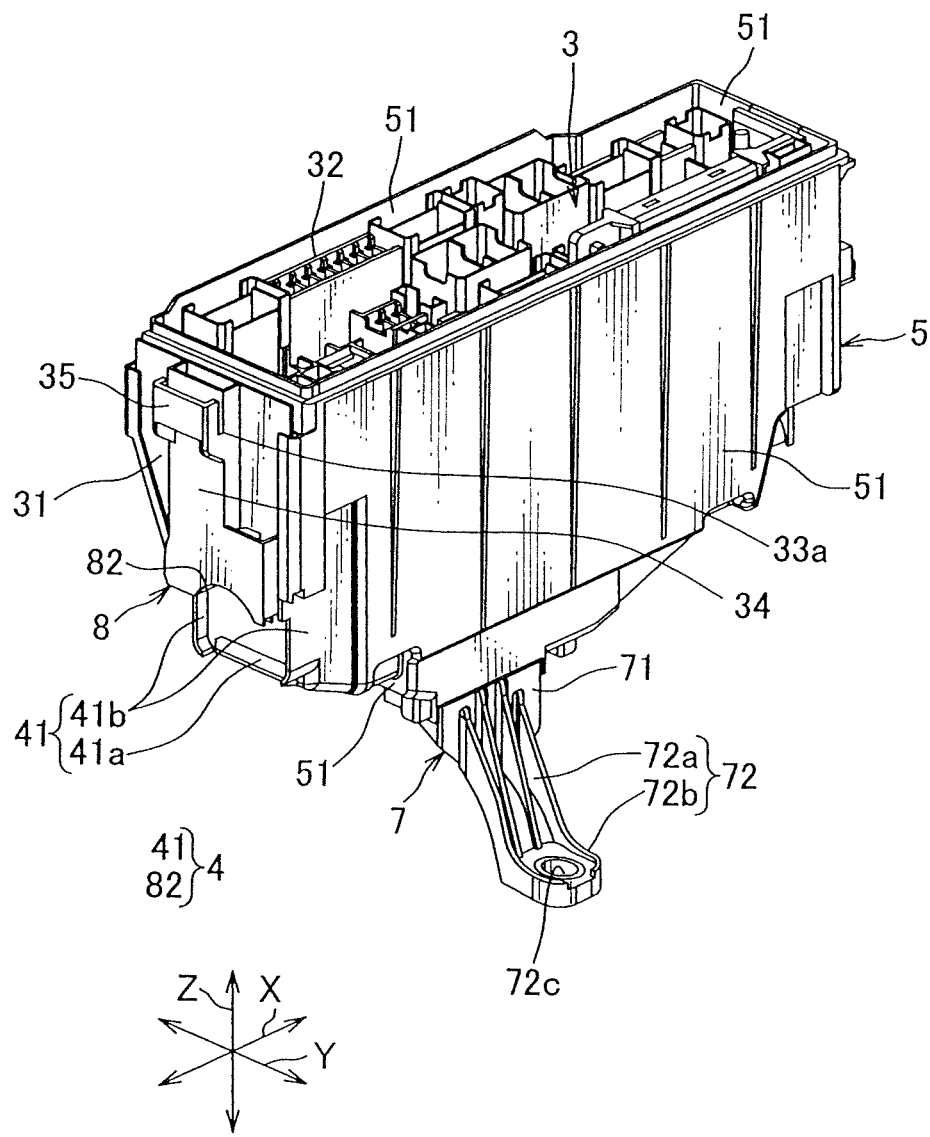
FIG. 2 is a perspective view showing the electrical junction box shown in FIG. 1 of which upper cover is removed.
Figure 3:
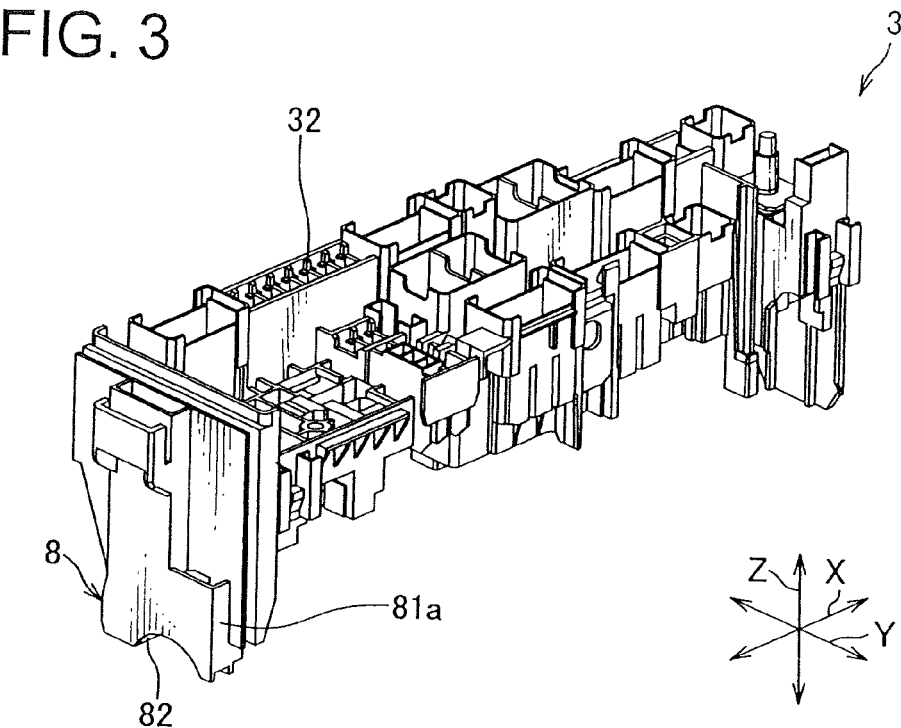
FIG. 3 is a perspective view showing a cassette block as a component of the electrical junction box shown in FIG. 1.
Figure 4:
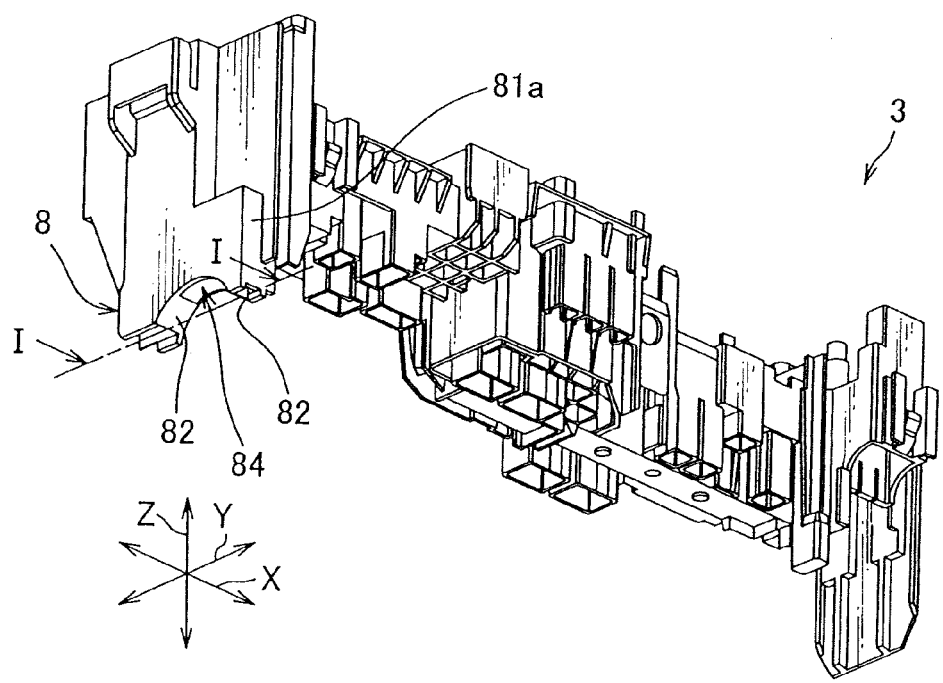
FIG. 4 is a perspective view showing the cassette block as a component of the electrical junction box shown in FIG. 1.
Figure 5:
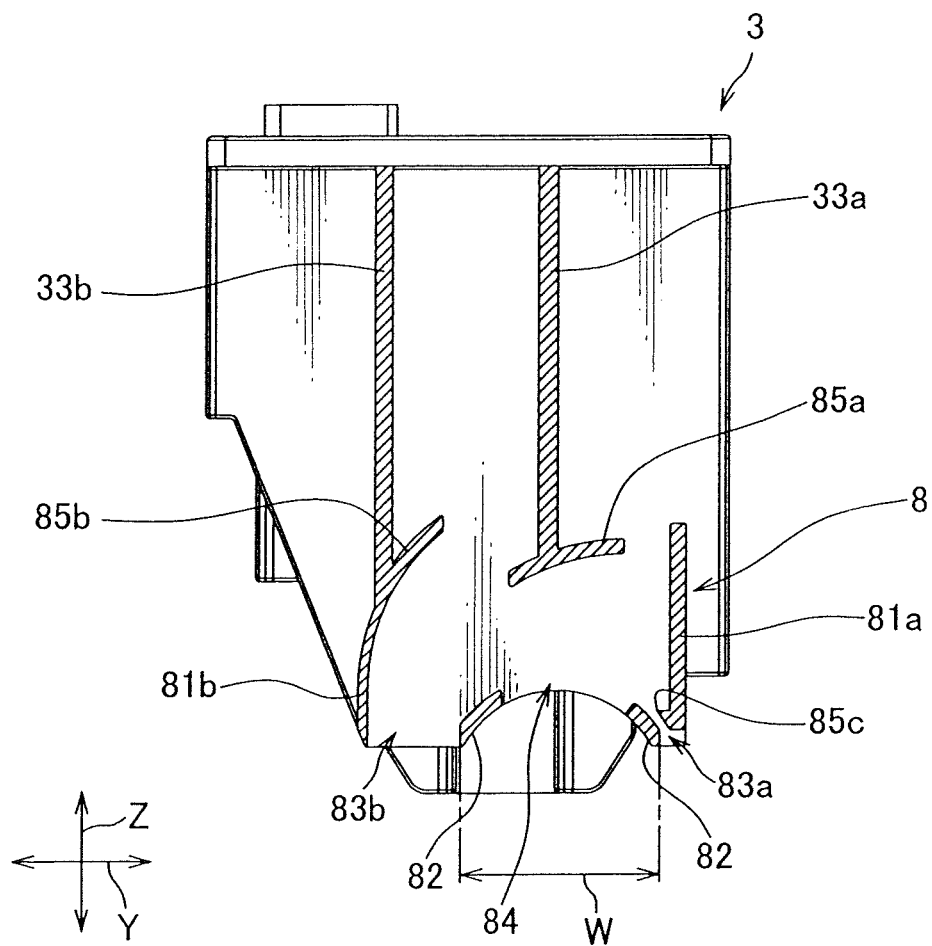
FIG. 5 is a sectional view taken on line I-I of FIG. 4.

Hereinafter, an attaching structure of a banding band according to the present invention will be explained with reference to FIGS. 1 to 5. FIG. 1 is a perspective view showing an embodiment of an electrical junction box having an attaching structure of a banding band according to the present invention. FIG. 2 is a perspective view showing the electrical junction box shown in FIG. 1 of which upper cover is removed. FIGS. 3 and 4 are a perspective view showing a cassette block as a component of the electrical junction box shown in FIG. 1. FIG. 5 is a sectional view taken on line I-I of FIG. 4.

The attaching structure of a banding band according to the present invention is embedded in the electrical junction box 1 shown in FIGS. 1 to 5. This electrical junction box 1 is mounted on an engine room or the like of a vehicle, receives a plurality of electric components such as a connector of a wiring harness, a relay, and a fuse, and electrically connects these electric components with a various electric devices mounted on a vehicle according to a predetermined pattern.

Such an electrical junction box 1 includes: a case 2 (FIG. 1) defining an outer profile of the electrical junction box 1; a plurality of electric components received in the case 2; a cassette block 3 (FIG. 2) holding the electric components and received in the case 2; and a pass-through portion 4 (FIG. 2) provided on the case 2 and the cassette block 3 for guiding a not-shown wiring harness out of the case 2.

As shown in FIG. 1, the case 2 includes: a case main body 5 in which the cassette block 3 is received; an upper cover 6 detachably provided at an upper side of the case main body 5; and a lower cover 7 detachably provided at a lower side of the case main body 5. The case main body 5, the upper cover 6, and the lower cover 7 are made of insulating synthetic resin, and formed by well-known injection molding.

Further, a vertical direction of the case 2 in this specification is a direction along an arrow Z in FIGS. 1 to 5. Further, this arrow Z direction is an attaching direction of the upper cover 6 to the case main body 5. Further, an arrow X and an arrow Y in FIGS. 1 to 5 are respectively perpendicular to a vertical direction Z.

As shown in FIG. 2, the case main body 5 is formed in a substantially rectangular tube shape of which both sides in the vertical direction Z are open, and made of a plurality of peripheral walls 51 extended in the vertical direction Z, and continued to each other. One of the peripheral walls 51 is provided with a notch notching an upper side in the vertical direction Z, and a sidewall 31 of the later-described cassette block 3 is exposed via the notch. Further, a gutter-shaped portion 41 as a component of the later-described pass-through portion 4 is formed on the case main body 5. The gutter-shaped portion 41 includes: a bottom wall portion 41a projected outward from an edge at a lower side in the vertical direction Z of the notch provided on the one peripheral wall 51; and a pair of standing wall portions 41b extended vertically from both ends in a direction Y of the bottom wall portion 41a. The pair of standing wall portions 41b respectively continues to the peripheral walls 51 adjacent to the one peripheral wall 51 provided with the notch.

As shown in FIG. 1, the upper cover 6 is formed in a box shape opening toward a lower side in the vertical direction Z, made of a ceiling wall 61 facing an opening at an upper side in the vertical direction Z of the case main body 5, and a peripheral wall 62 extended downward in the vertical direction Z from an outer edge of the ceiling wall 61. The upper cover 6 is attached to an upper side of the case main body 5 so as to cover the opening at the upper side in the vertical direction Z of the case main body 5. The peripheral wall 62 of the upper cover 6 is provided with a lock arm 63 for fixing the upper cover 6 to the later-described cassette block 3. The lock arm 63 is projected downward in the vertical direction Z from the peripheral wall 62 of the upper cover 6.

Further, as shown in FIG. 2, the lower cover 7 is made of a bottom wall 71 facing the opening at a lower side in the vertical direction Z of the case main body 5, and an attaching leg 72 projected downward in the vertical direction Z from the bottom wall 71. The lower cover 7 is attached to a lower side of the case main body 5 so as to cover the opening at the lower side in the vertical direction Z of the case main body 5.

The attaching leg 72 is composed of a leg portion 72a extended downward in the vertical direction Z from the bottom wall 71, and an attaching portion 72b provided at a tip at a lower side in the vertical direction Z of the leg portion 72a, and substantially parallel to the ceiling wall 61 of the upper cover 6. A screw hole 72c is formed on the attaching portion 72b so that while the attaching portion 72b is overlapped with a vehicle body panel, the attaching portion 72b is fastened with a screw, thereby the electrical junction box 1 is attached to the vehicle body panel.

As shown in FIGS. 3 and 4, the above cassette block 3 is made of insulating synthetic resin, and formed by well-known injection molding. The cassette block 3 is provided with a fuse box 32 formed in a box shape and in which a fuse is placed and the like. Further, a sidewall 31 of the cassette block 3 exposed from the case main body 5 is provided with an attaching structure of a banding band 8 (hereinafter, referred to as attaching structure 8).

As shown in FIG. 5, the attaching structure 8 includes: an attaching wall 82 to which a banding band 9 (FIG. 6) is attached; and first and second walls 81a, 81b between which the attaching wall 82 is interposed. The first and second walls 81a, 81b are respectively projected from the sidewall 31 of the cassette block 3 in an X direction, and opposite to each other in a Y direction. Further, the first and second walls 81a, 81b are formed in a straight shape along the vertical direction Z.

The attaching wall 82 is projected in the X direction from the sidewall 31 of the cassette block 3, and formed in a curve shape extended downward as approaching a pair of first and second walls 81a, 81b. The attaching wall 82 is separated upward from the bottom wall portion 41a provided on the case main body 5, and is a component of the pass-through portion 4. Namely, the pass-through portion 4 is composed of the gutter-shaped portion 41 provided on the case main body 5, and the attaching wall 82 provided on the cassette block 3.

As shown in FIGS. 6(B) and 7(B), the banding band 9 is attached to the attaching wall 82 by inserting the banding band 9 from a first gap 83a provided between the first wall 81a and the attaching wall 82 to a second gap 83b provided between the second wall 81b and the attaching wall 82. At this time, when the banding band 9 is attached in a manner that the wiring harness passing through the pass-through portion 4 is held between the attaching wall 82 and the banding band 9, the wiring harness is fixed to the cassette block 3.

The attaching wall 82 is provided with a through-hole 84 penetrating in the vertical direction Z. Further, the attaching structure 8 includes: a first guide wall 85a arranged at a position facing the through-hole 84; and a second guide wall 85b continued to the second wall 81b and arranged at a position facing the second gap 83b. The first guide wall 85a is formed in a curve shape inclined toward the attaching wall 82 as extended toward the second wall 81b. The second guide wall 85b is formed in a curve shape inclined toward the attaching wall 82 as extended toward the second wall 81b.

An end at the second wall 81b side of the first guide wall 85a is provided nearer the attaching wall 82 than an end at the first wall 81a side of the second guide wall 85b.

Further, the attaching structure 8 further includes: a third guide wall 85c projected from an end at a lower side in the vertical direction Z of the first wall 81a toward the second wall 81b, and disposed at a position facing the first gap 83c. Further, the third guide wall 85c is inclined away from the first gap 83c as extended away from the first wall 81a. Further, an end at the second wall 81b side of the third guide wall 85c is provided nearer the first guide wall 85a than an end at the first wall 81a side of the attaching wall 82.

Further, a portion nearer the first wall 81a than the through-hole 84 of the attaching wall 82 is inclined toward the first guide wall 85a as extended away from the first wall 81a, and a portion nearer the second wall 81b than the through-hole 84 of the attaching wall 82 is inclined toward the first guide wall 85a as extended away from the second wall 81b.

Further, the cassette block is further provided with a pair of sidewalls 33a, 33b (FIG. 5) projected in the X direction from the sidewall 31, and a sidewall 42 (FIG. 2) covering the first and second walls 81a, 81b, the attaching wall 82, the first to third guide walls 85a to 85c, and the sidewalls 33a, 33b. Further, as shown in FIG. 5, the pair of sidewalls 33a, 33b is separated from each other in the Y direction, extended straight in the vertical direction Z, and lower ends in the vertical direction Z of the sidewalls 33a, 33b are respectively continued to the first and second guide walls 85a, 85b. As shown in FIG. 2, the sidewall 34 is separated from the sidewall 31 in the X direction, and arranged parallel to the sidewall 31. Further, the sidewall 34 is provided with a lock receiving portion 35 for locking with a lock arm 63 provided on the upper cover 6.

Figure 6:
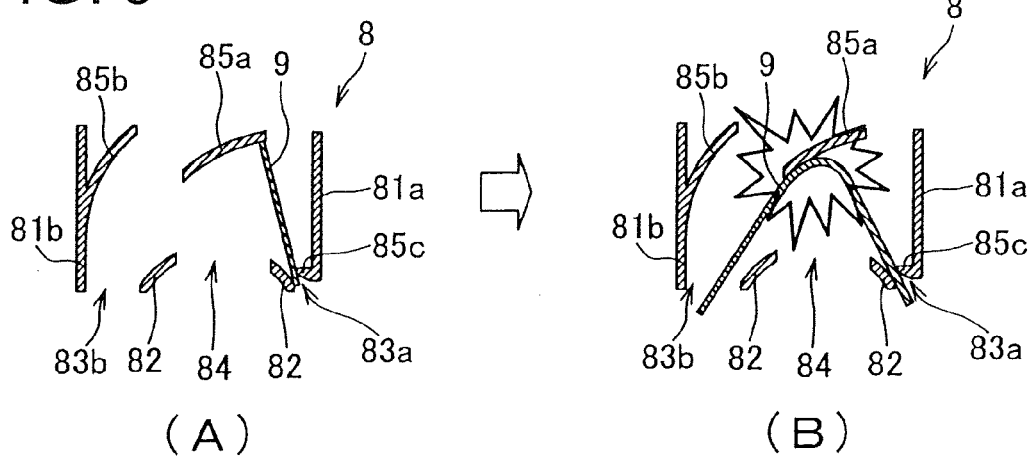
FIG. 6 is an explanatory view showing a procedure for attaching a banding band to the electrical junction box shown in FIG. 1.
Figure 7:
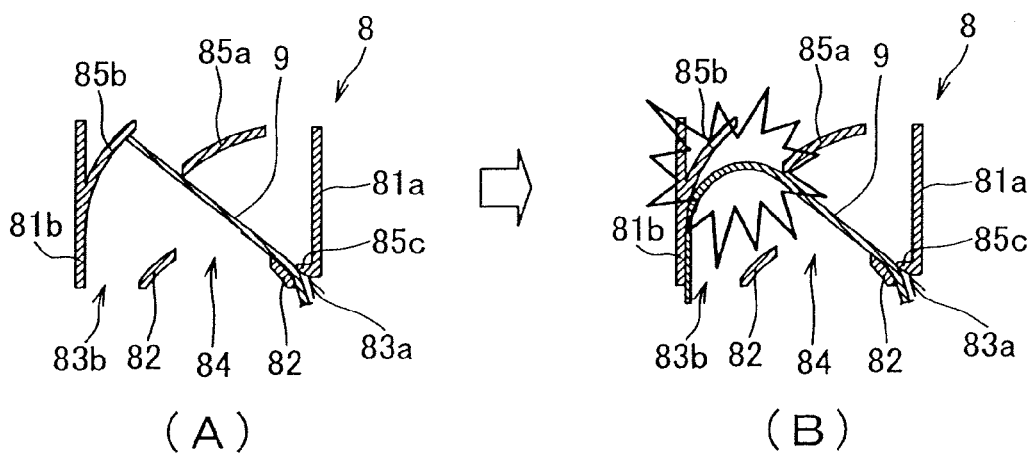
FIG. 7 is an explanatory view showing a procedure for attaching the banding band to the electrical junction box shown in FIG. 1.

Next, a procedure to attach the banding band 9 to the attaching structure 8 of the electrical junction box 1 will be explained with reference to FIGS. 6 and 7. First, while slidably abutted on the third guide wall 85c, the tip of the banding band 9 is inserted into the first gap 83a. By slidably abutted on the third guide wall 85c, the banding band 9 is not moved straight in the vertical direction Z but moved obliquely toward the first guide wall 85a. When the banding band 9 is further moved, as shown in FIG. 6(A), the tip of the banding band 9 is abutted on the first guide wall 85a. When the banding band 9 is still further moved, as shown in FIG. 6(B), when the tip of the banding band 9 is slidably abutted along the first guide wall 85a, the banding band 9 is curved toward the second gap 83b, and inserted into the second gap 83b.

In contrast, as shown in FIG. 7(A), when the banding band 9 inserted into the first gap 83a is inclined toward the second wall 81b, and not abutted on the first guide wall 85a, the banding band 9 is abutted on the second guide wall 85b. When the banding band 9 is further moved, as shown in FIG. 7(B), the tip of the banding band 9 is slidably abutted along the second guide wall 85b, curved toward the second gap 83b, and inserted into the second gap 83b. Then, when the banding band 9 inserted into the first and second gaps 83a, 83b is wound around an outside of the wiring harness passed through the pass-through portion 4, and locked, the wiring harness is attached to the cassette block 3 using the banding band 9.

Figure 8:
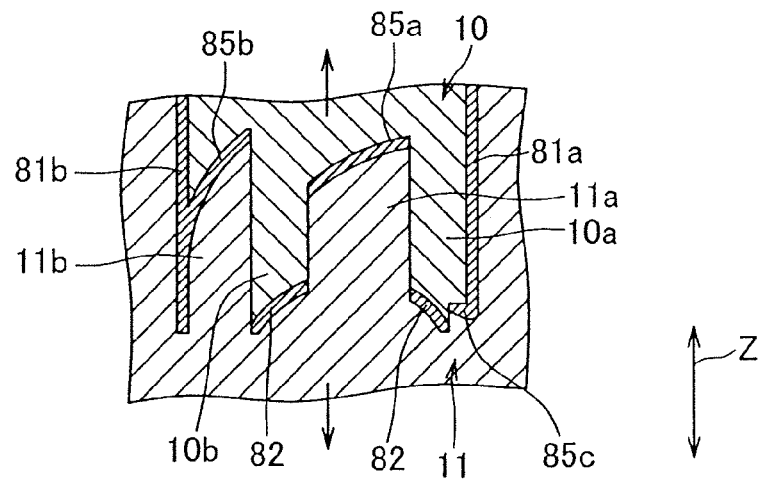
FIG. 8 is an explanatory view showing a mold for forming the attaching structure of a banding band shown in FIG. 5.
Figure 9:
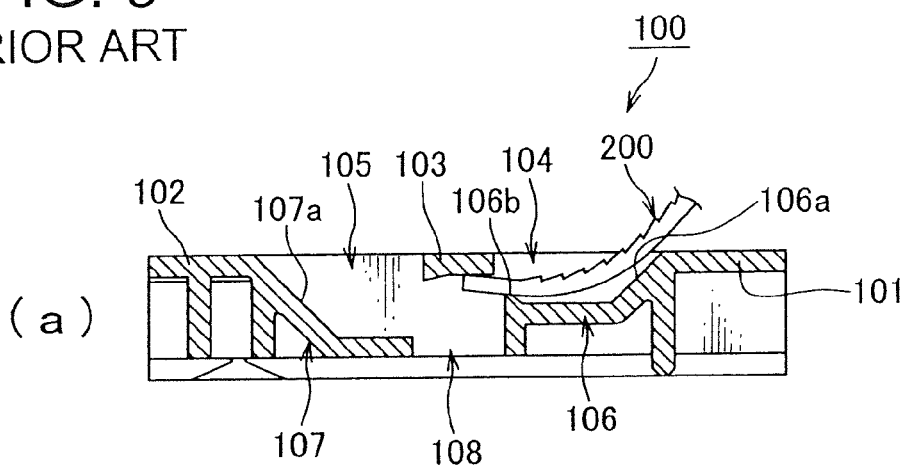
FIG. 9 is a sectional view showing an example of a conventional attaching structure of a banding band.
Figure 10:
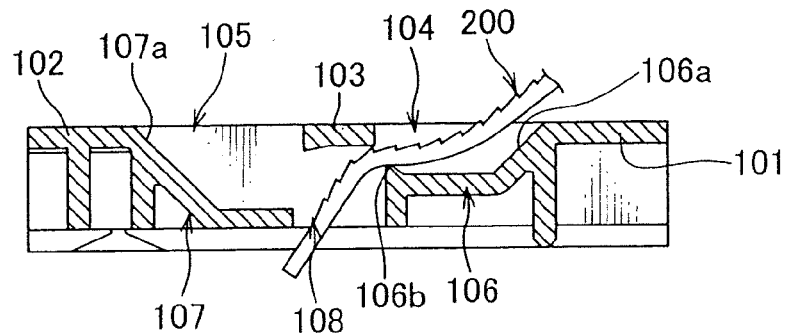
FIG. 10 is an explanatory view showing a problem of the attaching structure of a banding band shown in FIG. 9.

Next, a molding dire for molding the attaching structure 8 will be explained with reference to FIG. 8. As shown in FIG. 8, the attaching structure 8 is molded by first and second molding dies 10, 11 arranged in the vertical direction Z. The first molding die 10 forms inside portions of the first and second walls 81*a*, 81*b*, and upper portions in the vertical direction Z of the attaching wall 82 and the first to third guide walls 85*a* to 85*c*, and is pulled out upward in the vertical direction Z. This first molding die 10 is provided with a projection 10*a* for forming an upper portion in the vertical direction Z of the attaching wall 82 nearer the first wall 81*a* than the through-hole 84, and a projection 10*b* for forming an upper portion in the vertical direction Z of the attaching wall 82 nearer the second wall 81*b* than the through-hole 84. These projections 10*a*, 10*b* are projected downward in the vertical direction Z. When the first molding die 10 is pulled out upward in the vertical direction Z, the projections 10*a*, 10*b* are pulled out through a gap between the first wall 81*a* and the first guide wall 85*a* and through a gap between the first guide wall 85*a* and the second guide wall 85*b*.

Further, the second molding die 11 forms outside portions of the first and second walls 81*a*, 81*b*, and lower portions in the vertical direction Z of the attaching wall 82 and the first to third guide walls 85*a* to 85*c*, and is pulled out downward in the vertical direction Z. This second molding die 11 is provided with a projection Ha for forming a lower portion in the vertical direction Z of the first guide wall 85*a*, and a projection 11*b* for forming a lower portion in the vertical direction Z of the second guide wall 85*b*. These projections 11*a*, 11*b* are projected upward in the vertical direction Z. Further, when the second molding die 11 is pulled out downward, the projections 11*a*, 11*b* are respectively pulled out through the through-hole 84 and the second gap 83*b*.

According to the above attaching structure 8, the attaching wall 82 is provided with the through-hole 84, and the first guide wall 85*a* curved toward the attaching wall 82 as extended toward the second wall 81*b* is arranged at a position facing the through-hole 84. Further, the second guide wall 85*b* curved toward the attaching wall 82 as extended toward the second wall 81*b* is continued to the second wall 81*b* and arranged at a position facing the second gap 83*b*.

According to the above, as explained with reference to FIG. 8, the through-hole 84 of the attaching wall 82 works as a stripping hole of the projection 11*a* forming the first guide wall 85*a*, and the first guide wall 85*a* can be provided at the center of a stripping hole forming the attaching wall 82. Further, as explained with reference to FIGS. 6 and 7, by slidably abutted along the first guide wall 85*a*, the tip of the banding band 9 inserted into the first gap 83*a* is curved toward the second gap 83*b*, and inserted into the second gap 83*b*. Further, when the tip of the banding band 9 is not slidably abutted on the first guide wall 85*a*, the tip is slidably abutted on the second guide wall 85*b*, curved toward the second gap 83*b*, and inserted into the second gap 83*b*. Furthermore, by providing the first guide wall 85*a* by providing the through-hole 84 on the attaching wall 82, when a width W (FIG. 5) in the Y direction of the attaching wall 82 is increased, a stripping hole for forming the attaching wall 82 can be reduced. Further, regardless of a diameter size of the wiring harness, the banding band 9 can be fixed at two points, thereby the banding band 9 inserted from the first gap 83*a* can be surely guided to the second gap 83*b*, and the wiring harness is prevented from being displaced.

Further, according to the attaching structure 8 of the banding band 9, an end at the second wall 81*b* side of the first guide wall 85*a* is provided nearer the attaching wall 82 than an end at the first wall 81*a* side of the second guide wall 85*b*. Therefore, the tip of the banding band 9 which is not slidably abutted on the first guide wall 85*a* can be surely slidably abutted on the second guide wall 85*b*.

Further, according to the attaching structure 8 of the banding band 9, by providing the third guide wall 85*c*, the tip of the banding band 9 is moved toward the first guide wall 85*a*, therefore, the banding band 9 inserted from the first gap 83*a* can be further surely guided to the second gap 83*b*.

Further, according to the attaching structure 8 of the banding band 9, a portion of the attaching wall 82 nearer the first wall 81*a* than the through-hole 84 is inclined toward the first guide wall 85*a* as extended away from the first wall 81*a*, and a portion of the attaching wall 82 nearer the second wall 81*b* than the through-hole 84 is inclined toward the first guide wall 85*a* as extended away from the second wall 81*b*. Therefore, the wiring harness is further surely prevented from being displaced.

Incidentally, according to the above embodiment, the attaching structure 8 is provided on the cassette block 3. However, the present invention is not limited to this. For example, when the wiring harness is fixed to the case main body 5, the attaching structure 8 may be provided on the case main body 5. Namely, the attaching structure 8 may be properly provided on a position to which the banding band 9 is attached.

Further, according to the above embodiment, the through-hole 84 is provided at the center in the opposite direction Y of the attaching wall 82. However, the present invention is not limit to this. The through-hole 84 may be provided on any position between one end and the other end of the attaching wall 82 in the opposite direction Y.

Further, according to the above embodiment, the first and second walls 81*a*, 81*b* are provided in a straight shape along the vertical direction Z, namely, a penetrating direction of the first and second gaps 83*a*, 83*b*. However, the present invention is not limited to this. Shapes of the first and second walls 81*a*, 81*b* may be changed properly corresponding to a shape of a position to which the banding band 9 is attached. For example, such as a conventional embodiment, the first and second walls 81*a*, 81*b* may be arranged perpendicular to (arrow Y direction) the penetrating direction of the first and second gaps 83*a*, 83*b*.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

| Reference Signs List | |
|---|---|
| 8 | attaching structure of a banding band |
| 9 | banding band |
| 81a | first wall |
| 81b | second wall |
| 82 | attaching wall |
| 83a | first gap |
| 83b | second gap |
| 84 | through-hole |
| 85a | first guide wall |
| 85b | second guide wall |
| 85c | third guide wall |

What is claimed is:

1. An attaching structure of a banding band comprising:
an attaching wall to which the banding band is attached;
first and second walls between which the attaching wall is interposed;

a first gap provided between the attaching wall and the first wall;
a second gap provided between the attaching wall and the second wall;
a through-hole provided on the attaching wall;
a first guide wall opposed to the through-hole and inclined toward the attaching wall as extended toward the second wall; and
a second guide wall joined to the second wall, opposed to the second gap, and inclined toward the attaching wall as extended toward the second wall,
wherein the banding band is inserted from the first gap to the second gap to attach the banding band to the attaching wall.

2. The attaching structure of a banding band as claimed in claim 1,
wherein an end at the second wall side of the first guide wall is provided nearer the attaching wall than an end at the first wall side of the second guide wall.

3. The attaching structure of a banding band as claimed in claim 1, further comprising:
a third guide wall projected from the first wall toward the second wall, disposed at a position facing the first gap, and inclined away from the first gap as extended away from the first wall.

4. The attaching structure of a banding band as claimed in claim 2, further comprising:
a third guide wall projected from the first wall toward the second wall, disposed at a position facing the first gap, and inclined away from the first gap as extended away from the first wall.

5. The attaching structure of a banding band as claimed in claim 1,
wherein a portion of the attaching wall nearer the first wall than the through-hole is inclined toward the first guide wall as extended away from the first wall, and a portion of the attaching wall nearer the second wall than the through-hole is inclined toward the first guide wall as extended away from the second wall.

6. The attaching structure of a banding band as claimed in claim 2,
wherein a portion of the attaching wall nearer the first wall than the through-hole is inclined toward the first guide wall as extended away from the first wall, and a portion of the attaching wall nearer the second wall than the through-hole is inclined toward the first guide wall as extended away from the second wall.

7. The attaching structure of a banding band as claimed in claim 3,
wherein a portion of the attaching wall nearer the first wall than the through-hole is inclined toward the first guide wall as extended away from the first wall, and a portion of the attaching wall nearer the second wall than the through-hole is inclined toward the first guide wall as extended away from the second wall.

8. The attaching structure of a banding band as claimed in claim 4,
wherein a portion of the attaching wall nearer the first wall than the through-hole is inclined toward the first guide wall as extended away from the first wall, and a portion of the attaching wall nearer the second wall than the through-hole is inclined toward the first guide wall as extended away from the second wall.

* * * * *